United States Patent
Chen et al.

(10) Patent No.: US 11,777,957 B2
(45) Date of Patent: Oct. 3, 2023

(54) METHOD FOR DETECTING MALICIOUS ATTACKS BASED ON DEEP LEARNING IN TRAFFIC CYBER PHYSICAL SYSTEM

(71) Applicant: HANGZHOU DIANZI UNIVERSITY, Zhejiang (CN)

(72) Inventors: Yuanfang Chen, Zhejiang (CN); Ting Wu, Zhejiang (CN); Hengli Yue, Zhejiang (CN); Chengnan Hu, Zhejiang (CN)

(73) Assignee: HANGZHOU DIANZI UNIVERSITY, Hangzhou (CN)

( * ) Notice: Subject to any disclaimer, the term of this patent is extended or adjusted under 35 U.S.C. 154(b) by 942 days.

(21) Appl. No.: 16/703,089

(22) Filed: Dec. 4, 2019

(65) Prior Publication Data

US 2020/0106788 A1    Apr. 2, 2020

Related U.S. Application Data

(63) Continuation of application No. PCT/CN2018/083450, filed on Apr. 18, 2018.

(30) Foreign Application Priority Data

Jan. 23, 2018    (CN) .......................... 201810062032.2

(51) Int. Cl.
  *H04L 9/40* (2022.01)
  *H04W 12/128* (2021.01)
  *G06N 3/084* (2023.01)
  *G06N 3/04* (2023.01)
(52) U.S. Cl.
  CPC ........... *H04L 63/1416* (2013.01); *G06N 3/04* (2013.01); *G06N 3/084* (2013.01); *H04W 12/128* (2021.01)

(58) Field of Classification Search
  CPC ....... H04L 63/1416; G06N 3/04; G06N 3/084
  USPC ........................................................... 726/23
  See application file for complete search history.

(56) References Cited

U.S. PATENT DOCUMENTS

| | | | |
|---|---|---|---|
| 2005/0228666 A1* | 10/2005 | Liu ........................ | G10L 15/187 704/E15.02 |
| 2019/0138731 A1* | 5/2019 | Tan ......................... | G06N 7/01 |
| 2019/0215330 A1* | 7/2019 | Neuvirth ............. | H04L 63/1425 |

FOREIGN PATENT DOCUMENTS

| | | |
|---|---|---|
| CN | 101582813 A | 11/2009 |
| CN | 103778432 A | 5/2014 |
| CN | 104732237 A | 6/2015 |
| CN | 106453416 A | 2/2017 |
| CN | 106656981 A | 5/2017 |

(Continued)

*Primary Examiner* — Badri Narayanan Champakesan

(57) ABSTRACT

Disclosed is a method for detection a malicious attack based on deep learning in a transportation cyber-physical system (TCPS), comprising: extracting original feature data of a malicious data flow and a normal data flow from a TCPS; cleaning and coding original feature data; selecting key features from the feature data; cleaning and coding the key features to establish a deep learning model; finally, inputting unknown behavior data to be identified into the deep learning model to identify whether the data is malicious data, thereby detecting a malicious attack. The present invention uses a deep learning method to extract and learn the behavior of a program in a TCPS, and detect the malicious attack according to the deep learning result, and effectively identify the malicious attack in the TCPS.

1 Claim, 1 Drawing Sheet

(56) References Cited

FOREIGN PATENT DOCUMENTS

| CN | 106769048 A | 5/2017 |
|----|-------------|--------|
| CN | 106911669 A | 6/2017 |
| CN | 107256393 A | 10/2017 |
| KR | 101561651 B1 | 11/2015 |

* cited by examiner

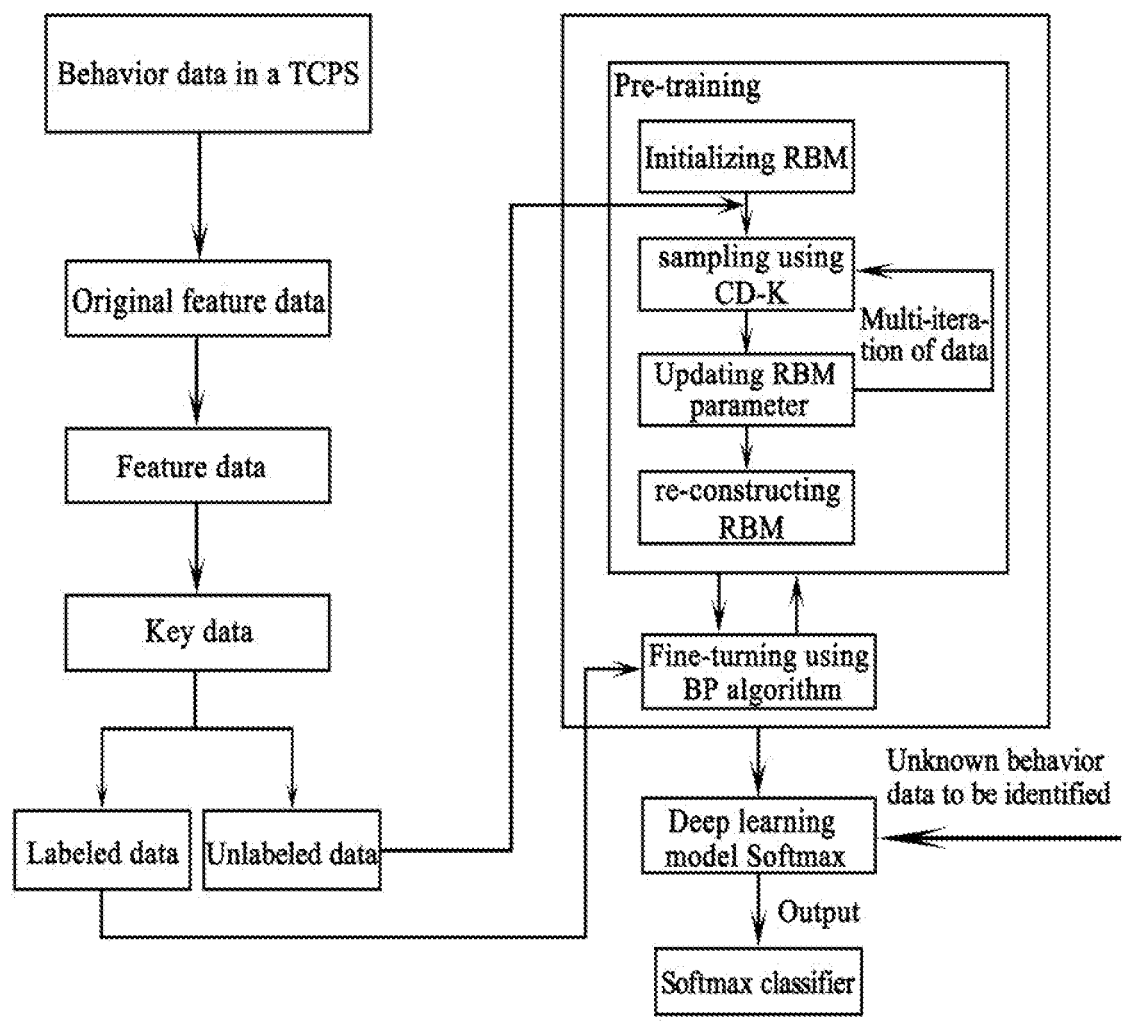

METHOD FOR DETECTING MALICIOUS ATTACKS BASED ON DEEP LEARNING IN TRAFFIC CYBER PHYSICAL SYSTEM

CROSS-REFERENCE TO RELATED APPLICATIONS

This application is a continuation of International Application No. PCT/CN2018/083450 with a filling date of Apr. 18, 2018, designating the United states, now pending, and further claims to the benefit of priority from Chinese Patent Application No. 201810062032.2, filed on Jan. 23, 2018. The content of the aforementioned application, including any intervening amendments thereto, is incorporated herein by reference in its entirety.

TECHNICAL FIELD

The present application relates to detection with transportation cyber-physical systems (TCPS), and more particularly to a method for detecting a malicious attack based on deep learning in an TCPS.

BACKGROUND

Transportation cyber-physical physical system (TCPS), as a specific application of cyber-physical system (CPS) in transportation, is a key technology for the development of the next generation intelligent transportation system (ITS). In the TCPS, a mobile vehicle and a traffic sensor transmit traffic condition information to a traffic controller via a wireless communication medium. Due to the open nature of wireless communication, the TCPS is extremely vulnerable to security attacks, such as eavesdropping and tampering, which leads to serious traffic accidents and great loss of life and property. Some advanced attacks can even adjust a strategy according to the features of the transmission of the information to maximize the negative impact on wireless communications. At present, there are limited methods of effectively detecting malicious attacks. Most methods rely on the features of a network protocol of TCPS to perform detection and not match importance to the data itself, and thus hardly find out new types of malicious behaviors; Moreover, malicious behaviors have increasing camouflage and complexity, or some malicious behaviors even change, making it even harder to find out.

SUMMARY

The object of the present application is to provide a method for detecting a malicious attack based on deep learning in a TCPS.

The method of the present invention includes the following steps:

1) extracting a feature of data flow from a TCPS: collecting malicious data flow and normal data flow from a TCPS, organizing the collected malicious data flow and the normal data flow into a general network frame format, removing irrelevant data, extracting features related to malicious attacks, and dividing the features according to a frame structure into bytes as original feature data;
2) cleaning and encoding the original feature data in step 1: cleaning the original feature data in step 1 to remove meaningless data and process missing data; encoding the cleaned feature data into classification values using one-hot encoding to construct a feature vector table;
3) selecting key features from the feature data obtained in step 2: according to feature importance in a random forest model, selecting key features that distinguish a malicious attack behavior from a normal behavior; dividing the selected key features into labeled data and unlabeled data to serve as training data of a deep learning model;
4) learning the key features obtained in step 3 to establish a deep learning model:
  i) performing a pre-training process without supervision of a Restriction Boltzmann Machine (RBM): initializing the RBM layers according to parameters such as the number of layers or neurons of the RBM; inputting the unlabeled feature data obtained in step 3 into the RBM; individually training the RBM layer by layer without supervision; after fully trained, outputting a trained RBM layer as an input of a next RBM layer, and then training the next RBM layer until all training data are fully learned; wherein
  the training process without supervision is as follows:
  feature vectors are sampled using Contrastive Divergence with k steps (CD-k) without supervision, and RBM parameters are updated; RBM training error is evaluated using mean square error (MSE); gradient descent algorithm (SGD) is used to perform multiple iteration until RBM training meets a requirement or a training period ends; and
  ii) performing a fine-tuning process using back propagation (BP) algorithm with supervision: inputting an output of a last RBM layer to a BP fine-tuning network; inputting the labeled data obtained in step 3, and fine-tuning the deep learning model using BP algorithm, reversely adjusting a weight of the BP fine-tuning network by a feedback mechanism of the BP fine-tuning until an optimal model is obtained; wherein
  each of hidden layers is calculated using the BP algorithm to obtain an output of each of the hidden layers; an error of the algorithm is calculated by taking a Softmax layer as an output layer and Cross-Entropy as a cost function, if there is an error, the error is reversely transmitted from the output layer to an input layer, and a weight of the neurons is adjusted; a total error is repeatedly iterated using gradient descent algorithm (SGD) until the total error meets a requirement or a training period ends;
5) inputting unknown behavior data to be identified into the deep learning model trained in step 4 to perform feature recognition, finally mapping the output of the deep learning model into an interval of 0-1 using a Softmax classifier of the output layer to obtain various types of probabilities, determining whether a category with a maximum probability category is a malicious or a normal sample, and if the number of the malicious samples predicted is greater than 1, a malicious attack exists in the unknown data; The greater number of the malicious samples identified indicates the higher probability of being maliciously attacked in a TCPS.

The present invention uses a deep learning method to extract and learn the behavior of a program in a TCPS, and detect a malicious attack according to the learning result; therefore, the present invention can effectively identify malicious attacks in the TCPS, reduce the possibility of being vulnerable to security attacks due to an open nature of wireless communication, and accurately identify a malware and an unknown malicious attack, thus achieving the effect of detecting and preventing malicious attacks. In addition, there is a huge amount of information in the TCPS, and the deep learning method is very suitable for mining data with large data volume. Increasing the data volume of the data set can further improve the performance of the model, while general machine learning algorithms do not have the advantage of significantly improving the results of the algorithm by increasing the amount of data. For the data itself, the present invention can overcome the problem that a traditional identification method can not accurately identify malicious attack or identify unknown malicious attacks, and realize the identification of malicious attacks in the TCPS.

BRIEF DESCRIPTION OF THE DRAWINGS

FIG. 1 is a flow chart of a method for detecting a malicious attach based on deep learning in a transportation cyber-physical system according to the invention.

DETAILED DESCRIPTION OF EMBODIMENTS

As shown in FIG. 1, provided is a method for detecting a malicious attack based on deep learning in a transportation cyber-physical system (TCPS) as described below.

Step 1: A feature of data flow was extracted from a TCPS: a malicious data flow and a normal data flow were collected from a TCPS, and were organized into a general network frame format. Irrelevant data was removed, and features related to malicious attacks were extracted, and divided according to a frame structure into bytes as an original feature data.

In this embodiment, a total of 1000 pieces of data including 500 malicious data and 500 normal data were used. The 500 pieces of normal data were data flow acquired from the Controller Area Network (CAN) bus under a normal state of a vehicle, and the 500 pieces of data were data flow acquired from the CAN bus in the case of Denial-of-Service (DoS) attack, Fuzzy attack and Spoofing attack, and then the acquired data flow was organized into a general CAN message format, and irrelevant data such as frame header, end of frame, check digit, arbitration bit, etc. was removed. Remote frames and data frames related to malicious attacks were extracted as features of remote and data frames, and the features were divided in units of bytes to obtain original feature data.

Step 2: The original feature data of the CAN bus behavior in step 1 was cleaned and encoded.

The original feature data of step 1 was cleaned to remove meaningless data and process empty frame; the feature data was encoded after cleaned into classification values using one-hot encoding to construct a feature vector table.

Step 3: The feature data obtained in step 2 was selected to obtain key features: according to feature importance in a random forest model, the key features ware selected to distinguish a malicious attack behavior from a normal behavior. The selected key features were divided into labeled data and unlabeled data to serve as training data of a deep learning model.

Step 4: The key features obtained in step 3 were learned to establish the deep learning model, which is performed as follows:
  i) A pre-training process of a Restriction Boltzmann Machine (RBM) without supervision: the RBM was initialized, and there were two RBM layers and 512 neurons in each layer in this embodiment. The unlabeled CAN bus behavior feature data obtained in step 3 was input into the RBM; each layer of the RBM was trained layer by layer without supervision, and after fully trained, the output of the current RBM layer was used as the input of a next layer of the RBM, and then the next layer of RBM was trained until all training CAN bus behavior characteristic data were fully learned;

the training process without supervision was as follows:
feature vectors were sampled using CD-k without supervision, and RBM parameters were updated; an RBM training error was evaluated using mean square error (MSE); gradient descent algorithm (SGD) was used to perform multiple iteration until RBM training met a requirement or a training period ended.
  ii) A fine-tuning process using back propagation (BP) algorithm without supervision: an output of a last RBM layer was used as an input of a BP fine-tuning network; the labeled data obtained from step 3 was input, and the deep learning model was fine-tuned using BP algorithm; a weight of the BP fine-tuning network was adjusted reversely by a feedback mechanism of the BP network until an optimal model was obtained;

specifically, each of hidden layers was calculated using the BP algorithm to obtain an output of each of the hidden layers; an error of the algorithm was calculated by taking a Softmax layer as an output layer and Cross-Entropy as a cost function, and if there was an error, the error was reversely transmitted from the output layer to an input layer, and a weight of the neurons was adjusted; a total error was repeatedly iterated using gradient descent algorithm (SGD) until the total error met a requirement or a training period ended.

Step 5: Unknown behavior data to be identified was input into the deep learning model trained in step 4 to perform feature recognition, and finally the output of the deep learning model was mapped into an interval of 0-1 using a Softmax classifier of the output layer to obtain the probability of each frame data flow of being malicious behavior and normal behavior. A malicious or a normal sample is determined by a category with maximum probability, and if the number of the malicious samples predicted was greater than 1, a malicious attack exists in the unknown data. The greater number of the identified malicious samples indicates the higher probability of the CAN bus of being maliciously attacked.

In order to verify the effectiveness of the method of the present invention, several comparison experiments were carried out based on the CAN bus behavior data set with 10 different data volumes and four conventional machine learning algorithms, namely, decision tree, support vector machine, random forest and Softmax regression algorithm. A comparison on accuracy between the present method and four conventional algorithms was shown in the following table.

| Detection method | Precision % | Recall rate | F1 score % | AUC % | Accuracy % |
|---|---|---|---|---|---|
| Decision tree | 83% | 81% | 82% | 82% | 82% |
| Softmax regression | 84% | 83% | 84% | 84% | 84% |
| Random forest | 86% | 87% | 86% | 87% | 87% |
| Support vector machine | 89% | 86% | 88% | 87% | 87% |
| Deep leaning detection | 93% | 90% | 91% | 91% | 91% |

It was found that the precision of the model based on deep learning of the present invention is 12.61% higher than that of the Softmax regression algorithm, 5.76% higher than that of tree algorithm, 3.20% higher than that of the support vector machine algorithm, 2.61% higher than that of the random forest algorithm, and the accuracy of the model was improved by 6% on average, indicating that the method of the invention was more accurate and efficient than the general machine learning.

What is claimed is:

1. A method for detecting a malicious attack based on deep learning in a transportation cyber-physical system (TCPS), comprising:
1) extraction of features of data flow from a TCPS
   collecting malicious data flow and normal data flow from a TCPS, organizing the collected malicious data flow and the normal data flow into a general network frame format, removing irrelevant data, extracting features related to malicious attacks, and dividing the features, according to a frame structure, into bytes as original feature data;
2) cleaning and encoding of the original feature data obtained in step 1
   cleaning the original feature data in step 1 to remove meaningless data and process missing data; encoding the cleaned feature data into classification values using one-hot encoding to construct a feature vector table;
3) selection of key features from the feature data obtained in step 2
   according to feature importance in a random forest model, selecting key features that distinguish a malicious attack behavior from a normal behavior; dividing the selected key features into labeled data and unlabeled data to serve as training data of a deep learning model;
4) learning of the key features obtained in step 3 to establish the deep learning model
   i) performing a pre-training process without supervision of a Restriction Boltzmann Machine (RBM): initializing RBM layers according to the number of layers or neurons of the RBM; inputting the unlabeled data obtained in step 3 into the RBM; individually training the RBM layer by layer without supervision; after fully trained, outputting a trained RBM layer as an input of a next RBM layer, and then training the next RBM layer; repeating the training until all training data are fully learned;
   wherein the training process without supervision is as follows:
   feature vectors are sampled using Contrastive Divergence with k steps (CD-k) without supervision, and RBM parameters are updated; an RBM training error is evaluated using mean square error (MSE); gradient descent algorithm (SGD) is used to perform multiple iteration until RBM training meets a requirement or a training period ends; and
   ii) performing a fine-tuning process using back propagation (BP) algorithm with supervision: inputting an output of a last layer of RBM to a BP fine-tuning network; inputting the labeled data obtained in step 3, and fine-tuning the deep learning model using the BP algorithm, reversely adjusting a weight of the BP fine-tuning network by a feedback mechanism of the BP fine-tuning network until an optimal model is obtained; wherein
   each of hidden layers is calculated using the BP algorithm to obtain an output of each of the hidden layers; an error of the BP algorithm is calculated by taking a Softmax layer as an output layer and Cross-Entropy as a cost function, if there is an error, the error is reversely transmitted from the output layer to an input layer, and a weight of the neurons is adjusted; a total error is repeatedly iterated using gradient descent algorithm (SGD) until the total error meets a requirement or a training period ends;
5) inputting unknown behavior data to be identified into the deep learning model trained in step 4 to perform feature recognition, finally mapping the output of the deep learning model into an interval of 0-1 using a Softmax classifier of the output layer to obtain various types of probabilities, determining whether a category with a maximum probability is a malicious sample or a normal sample, and if the number of the malicious samples predicted is greater than 1, indicating that the malicious attack exists in the unknown behavior data.

* * * * *